Sept. 5, 1933.  E. L. BRETT  1,925,081
NONREVERSE DEVICE FOR SHAFTS
Filed Oct. 30, 1931
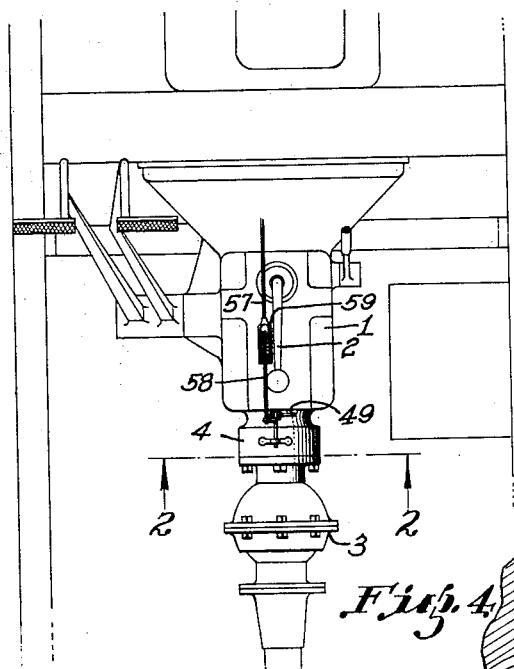
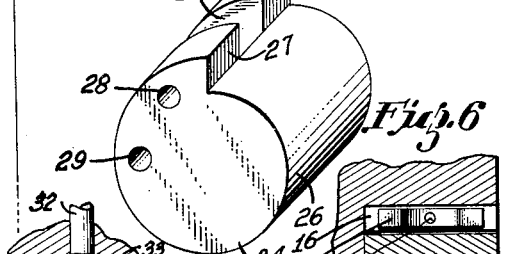
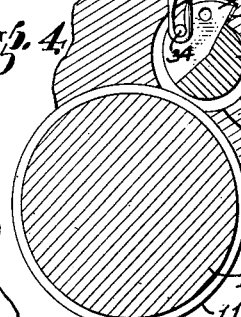
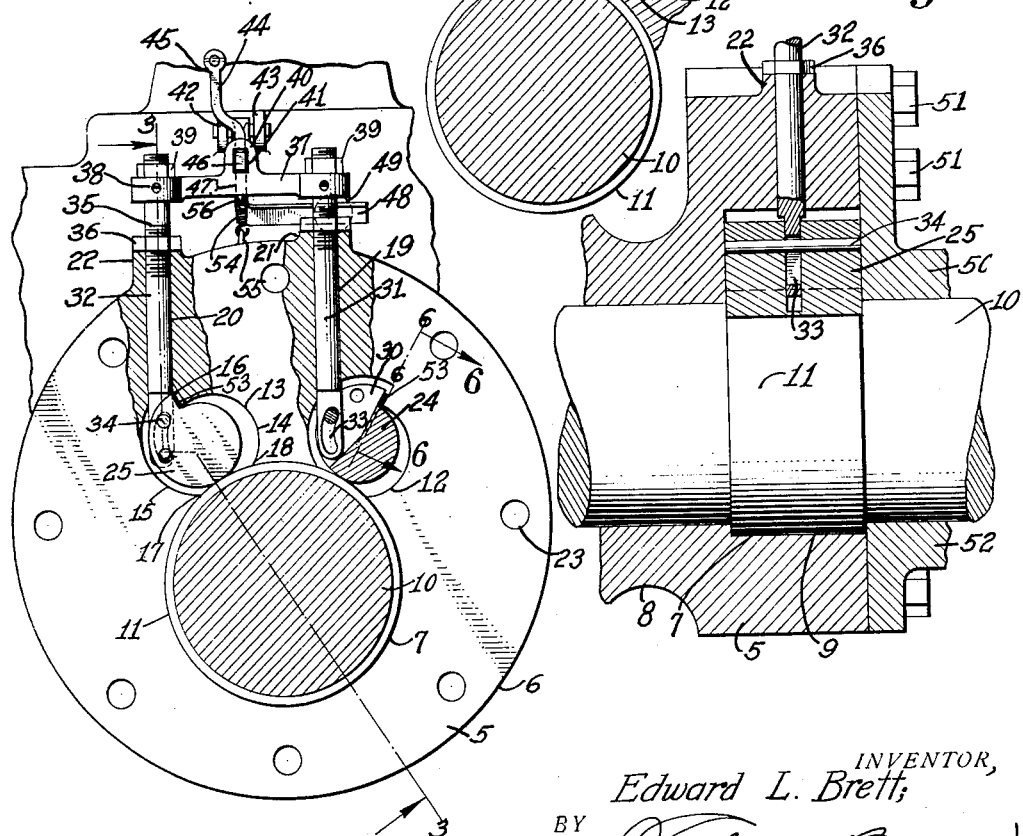
INVENTOR,
Edward L. Brett,
BY
ATTORNEY Patented Sept. 5, 1933

1,925,081

UNITED STATES PATENT OFFICE 1,925,081

NONREVERSE DEVICE FOR SHAFTS

Edward L. Brett, Burbank, Calif., assignor of one-half to Thomas H. Dearr, Burbank, Calif.

Application October 30, 1931. Serial No. 571,999

6 Claims. (Cl. 192—4)

This invention relates to braking devices, and more particularly to a non-reverse device for shafts.

The invention is praticularly adaptable for retarding or checking or arresting the rearward movement of motor vehicles when said vehicles are on grades or inclines.

A general object of the invention is to provide a simple and effective device for restraining the rotation in a reverse direction of rotatable elements, especially those elements which form a part of the driving gear of motor vehicles, and thereby prevent the rearward movement of such vehicles independently of the usual braking mechanism generally employed.

A specific object of the invention is to provide a device of this character for especial use on motor vehicles, of which the device shall form a component and in which it may be readily incorporated.

Another and important object of the invention is to provide a device of this type which is normally automatically operative to check the rearward movement of a motor vehicle, and which is controllable to permit the vehicle to be moved rearwardly.

The device is adaptable for purposes other than motor vehicles and may be used with any type of line shaft for preventing reverse rotation.

With the above and other objects in view, the invention consists in the novel and useful provision, formation, construction, association, and relative arrangement of parts, members and features, all as shown in a certain embodiment in the accompanying drawing, described generally, and more particularly pointed out in the claims.

These and other objects are accomplished by a form of embodiment of the invention more specifically expressed in a preferred form in the accompanying drawing which forms a part of this disclosure, and in which:

Figure 1 is a fragmentary plan view of the invention incorporated in a motor vehicle, said invention being applied to the gear case, Figure 2 is an enlarged elevation, partly in section, on the line 2—2 of Figure 1, Figure 3 is a sectional view on the line 3—3 of Figure 2, Figure 4 is a fragmentary detail transverse section showing certain elements of the invention in changed relation from that of Figure 2, Figure 5 is a perspective view of a locking member utilized in practicing the invention, and, Figure 6 is a sectional view on the line 6—6 of Figure 2.

Referring to Figure 1, I have shown a portion of a vehicle, of which 1 is a gear box, the gears therein being shifted by a lever 2. No particular type of gear box is contemplated, and ordinarily one of the shafts of the gear box is associated with the clutch, while a second shaft is associated with a propeller shaft. 3 is an universal joint. In the adaptation of the invention shown, I have placed my device, herein designated as an entirety by 4, between the gear box and the universal. It is obvious that other arrangements could be as readily resorted to. While I have shown the invention as directly connected to the gear box, yet it might form an integral portion of or be incorporated within the gear box.

Referring specifically to Figures 2 and 3, with respect to the invention 4, I have provided a casing 5 having a circular periphery 6 and an eccentric transverse bore 7. This said casing is likewise annularly grooved at 8. The diameter of the bore 7 is enlarged at 9. The main shaft 10 is passed through the bore 7 and said shaft is provided with a portion of enlarged diameter 11, fitting within the enlarged bore portion 9. The casing 5 is provided with one or more cam openings, in the present instance two, in the plane of the bore portion 9, as shown at 12 and 13. These cam openings may be designated as internal involutes, in that it is apparent upon inspection of the drawing that both cam openings, which are identical in construction, have two curved cam surfaces 14 and 15 of different radius, and that a wall 16 interconnects the two portions of different radius. Both curved portions are interrupted where they communicate with the portion of enlarged diameter 9 of the bore 7, as shown at 17 and 18. The said casing is provided with two bores 19 and 20 in spaced substantial parallel alignment, and these said bores communicate with the periphery of the casing, in one instance, and with the cam surfaces of the cam openings 12 and 13 in the second instance. More particularly, the said bores 19 and 20 open in the cam surface of greatest radius, to-wit, 15. The periphery of the said casing adjacent the bores 19 and 20 is provided with flat headed enlargements 21 and 22. The casing is also formed or provided with a plurality of spaced, tapped transverse bores 23. As stated, this said casing is adapted to be secured to the gear box 1, and the main shaft 10 from the gear box is passed through the bore 7 of the said casing 5.

Adapted for placement within both said cam openings 12 and 13 are ratchets 24 and 25, constituting locking members for the shaft 7 under certain operating conditions of the shaft. Both said ratchets are similarly constructed and, therefore, reference characters applied to one are applied to the other. The ratchet shown in Figure 5 has an eccentric surface 26 and an end elevation of the said ratchet shows that said eccentric surface conforms generally to the cam opening within which it is to be received, although said ratchet has not as great a transverse area as the said opening. In this respect, the said ratchet has a curved surface of one radius and a second curved surface of a greater radius with a wall 27 interconnecting the two curved surfaces of different radius. The ratchet is transversely bored at 28 and, in fact, I may provide a plurality of said transverse bores as, for instance, illustrated at 29. The said ratchet is likewise provided with a segmental slot 30 intermediate the length of said ratchet. This said slot communicates with the wall 27 and in this respect, the said wall is interrupted.

As stated, the said ratchets are adapted for placement within the cam openings of the casing 5, with the walls 27 of said ratchets facing the walls 16 of the cam openings. Ordinarily, the eccentric surfaces of said ratchets would be in engagement with the periphery of the enlargement 11 of the said shaft 10, substantially as shown in Figure 2. In order to control the engagement of said ratchets with the periphery of the enlargement 11 of the said shaft, I have provided a link for each ratchet. The said links are shown in Figure 2 and designated by 31 and 32. Said links are passed through the bores 19 and 20 and one end of both said links is provided with an arcuate longitudinally extending slot 33. Furthermore, the portion of the said links carrying the slot is flattened for reception within the slots 30 of the ratchets. Both ratchets carry a pin 34 passed through one of the openings 28 or 29 and through the slots 33 of the respective links. The opposite end portions of the said links are screw-threaded, as shown for both thereof, at 35. Nuts 36 carried on said screw-threads permit adjustment of the said links relative to the said ratchets, the said nuts bearing against the headed enlargements 21 and 22. A cross piece or connecting bar 37 joins the two links and above the nuts 36. In this respect, the said links are both passed through openings in said connecting bar, and set screws or the like 38, carried by the connecting bar engage the said links for maintaining the connecting bar in a selected position relative to the links. Nuts 39 carried on the links bear against the top surface of the connecting bar. These said nuts also provide an adjustment of the connecting bar relative to the said links prior to engagement of said screws 38 with said links. The connecting bar is provided with an upstanding lug 40 which is transversely bored at 41. Pivoted between a pair of spaced lugs 42 and 43, secured to the crank case, is a lever 44. This said lever has three arm portions 45, 46 and 47. The arm portion 46 is at right angles to the arm portions 45 and 47. The arm 46 has a portion thereof extending through the transverse bore 41 of the lug 40. The arm 47 has secured thereto an arm 48. This arm is substantially at right angles to the arm 47.

As is ordinary practice, the gear box is provided with gear shift rods and in Figures 1 and 2, I have shown a gear shift rod at 49. In the present instance, this gear shift rod controls low gear and reverse gear, and when the shift lever 2 is moved to bring reverse gear into operation, the shift rod 49 extends outwardly from an end of the gear box 1, as shown in Figure 1. The arm 48 is in the path of the shift rod 49 so that the shift rod when moved outwardly from the gear box will engage said arm.

For the purpose of enclosing the ratchets, I have provided a cover plate 50, and this said cover plate is provided with a plurality of transverse bores adapted to align with the bores 23 of the casing. Headed screws 51 pass through the bores of the plate and are in screw-threaded engagement with the tapped bores 23 and, accordingly, the plate is held to said casing, as shown in Figures 1 and 3. It will be observed that this cover plate is flanged at 52, and that said cover plate has a central bore corresponding to the general diameter of the shaft 10. Thus, it will be seen that the enlarged portion 11 of the said shaft is maintained between the said cover plate and the bore 9 of the casing.

The operation, uses and advantages of the invention just described are as follows:

I have assumed that the invention is to be used in conjunction with the propeller shaft or drive shaft of a motor vehicle for the purpose of preventing retrograde movement of said vehicle, when the said vehicle is on a slope. It is intended that, in the use of the invention as aforesaid, when a vehicle comes to a stop on a grade, it will be unnecessary for the operator upon throwing out the clutch, to likewise hold the vehicle against backward movement by placing his foot upon the brake. The device will, therefore, make driving much easier because the hand throttle need not be used to cause the vehicle to move forwardly up the inclination when the driver so desires, but the foot throttle may be utilized at all times. However, the invention has been so arranged that when the gears are shifted into reverse, that my device for preventing retrograde movement of the vehicle is out of operation.

As stated in the preamble of the specification, I do not restrict my invention to its use on motor vehicles, as it may be utilized for any turnable member to prevent counter rotation of such member.

Assuming the parts in the position shown in Figure 2, a portion of the eccentric surfaces of both ratchets is in engagement with the periphery of the enlargement 11 of the shaft 10. The adjustment of the links is such that the pins 34 are adjacent the upper terminus of the slots 33 of both links. Furthermore, the walls 27 of both ratchets are adjacent the walls 16 of the cam openings 12 and 13. However, direct contact between the respective walls aforesaid is prevented through the medium of the leaf springs or other resilient means, shown in Figure 6. Assuming a leaf spring is used, the leaf spring 53 is of the bowed type and the center of said bow is pinned, as shown at 54, to the wall 16 for both cam recesses. This leaves the arm portion free for engagement with the interrupted walls 27 of both ratchets. Thus, when the ratchets are in the position shown in Figure 2, the leaf springs are compressed. The arms of both leaf springs never at any time when compressed extend beyond the ends of the ratchets. When the links 31 and 32 are moved upwardly, the ratchets are lifted from their engagement with the periphery of the enlargement 11 of the shaft 10, as shown in Figure 4. When the links are released or permitted to move downwardly, the leaf springs 53 which have been compressed by the upward movement of the links, now expand and give the said ratchets an initial movement. Further lowering of the links will permit coengagement of the ratchets and the enlargement 11. It will, therefore, be seen that the ratchets are brought into or out of working contact with the shaft by partial revolution thereof through actuation of the links. Under ordinary conditions, the said ratchets are in engagement with the part 11, and when the gear shift 2 moves the gears into reverse position, the shift rod 49 engages the arm 48 and rocks the lever 47, which in turn causes rocking movement in an upward direction of the lever 46 to raise the cross piece 37 and hence lift the links to in turn release the ratchets from engagement with the enlargement 11, to the position shown in Figure 4. When the gears are shifted from reverse to a neutral position, the shift rod moves inwardly of the gear box and to assure return of the ratchets to the position shown in Figure 2 from the position shown in Figure 4, I have provided a coil spring 54, one end of which is hooked to an eye-type lug 55 carried by the casing 5 and the opposite end of which is hooked to an eye-type lug 56 carried by the cross piece 37. Obviously, this coil spring tends to draw the cross piece downwardly and therefore move the links within the bores 19 and 20 until the nuts 36 seat against the headed enlargements 21 and 22.

Under certain conditions, it is desirable to release the device entirely so that regardless of how the gears are shifted, the device is not in operative condition. To accomplish this, I have provided a pair of links 57 and 58, which are interconnected through the medium of a compression spring 59 with the said link 58 secured to the lever 45. The link 57 extends within the motor vehicle and is provided with an end piece (not shown) whereby the operator upon pulling said link will in turn pull the link 58 to rock the lever 45 and lift the cross piece 37 so that the ratchet assumes the position shown in Figure 4. Suitable means may likewise be provided in the driver's compartment for holding the link 57 in any adjusted position. Obviously, when the link 57 is released, the spring 54 will assure a proper return of the leverage 44 to permit the device as an entirety to again function in a normal manner.

The linkage arrangement with the spring therebetween also has a very important function to perform. If the ratchets should become locked against the shaft, a pull upon the link 57 would likewise exert a pull upon the link 58 sufficient to compress the spring 59. If the vehicle was then moved forwardly slightly, the ratchets would tend to slip relative to the shaft and in so doing, immediately release the ratchets relative to the shaft which would permit the spring 59 to suddenly expand between the two links and move the link 58 upwardly, which in turn would produce movement of the leverage, the links 31 and 32, and position the ratchets as shown in Figure 4. Thus, if the slightest difficulty is experienced, which is not likely, the driver, by simply tensioning the spring 59 by moving the link 57, will be assured of proper release of the ratchets through the medium of the spring 59.

While I have not shown any particular oiling system, it is apparent that the usual method of oiling or greasing may be resorted to for the working parts.

It is obvious that various changes and modifications and variations may be made in practicing the invention in departure from the particular showing of the drawing without departing from the true spirit thereof.

I claim:

1. The combination with the rotary element of a casing in part surrounding said rotary element, said casing being formed with a cam opening, and a ratchet having an eccentric surface within said cam opening and adapted when in one position for contact with said rotary element, said rotary element being adapted for movement in one direction, opposite movement being checked by ratchet engagement between the rotary element and a cam surface.

2. In a device for checking the rotation of a rotary element comprising in combination with said element, a stationary casing formed with an opening through which said rotary element is passed, said casing being provided with a cam opening communicating with the first named opening, a ratchet having an eccentric surface within said cam opening, and means engaging said ratchet for moving said ratchet into engagement with said rotary element or out of engagement therewith; the said surface of the ratchet and the cam opening cooperating when in one position to bind the rotary element against rotation in one direction.

3. In a device of the character disclosed, a casing formed with a through bore, said casing being provided with a cam opening communicating with said bore, a ratchet provided with an eccentric surface within said cam opening, a link secured to said ratchet, and means external said casing for moving said link to in turn move said ratchet relative to the cam opening and into the through bore by partial revolution of said ratchet.

4. A device for checking the rotation of a rotary element comprising, in combination with said element, a casing formed with a through bore through which said element is arranged to extend, a cam recess within said casing in communication with the through bore, an eccentric surface ratchet within said cam recess, a link pinned to said ratchet for rotating said ratchet within said cam recess, and means within said cam recess and in engagement with said ratchet normally urging said ratchet to rotate in one direction to position said ratchet into engagement with said rotary element.

5. A device for checking the rotation of a rotary element comprising in combination with said element, a stationary casing formed with a bore and through which said rotary element is adapted to extend, said casing being provided with a pair of spaced cam recesses communicating with the said bore, eccentric surface ratchets within both said cam recesses, a link for both ratchets, and common means for moving both said links simultaneously to in turn cause partial rotation of both ratchets to position the ratchets in engagement with the rotary element or out of engagement therewith.

6. The combination with a gear box having a shift rod adapted to be extended therefrom and a rotary element, of a stationary casing secured to said gear box and provided with a bore through which said rotary element is passed, said casing being formed with a recess communicating with the casing bore, a ratchet within said recess, and combination link and lever means secured to said ratchet and in the path of movement of said shift rod and whereby when said shift rod is in one position, the lever is rocked to in turn move said link to cause partial revolution of the ratchet within said recess to in turn permit engagement or disengagement between the ratchet and rotary element.

EDWARD L. BRETT.